(12) United States Patent
Saito et al.

(10) Patent No.: US 7,261,009 B2
(45) Date of Patent: Aug. 28, 2007

(54) MONITOR FOR INJECTION MOLDING MACHINE

(75) Inventors: Osamu Saito, Yamanashi (JP); Kenji Araki, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 252 days.

(21) Appl. No.: 11/002,309

(22) Filed: Dec. 3, 2004

(65) Prior Publication Data

US 2005/0092113 A1   May 5, 2005

Related U.S. Application Data

(62) Division of application No. 10/749,374, filed on Jan. 2, 2004.

(30) Foreign Application Priority Data

Jan. 15, 2003   (JP)   ............................. 2003-006705

(51) Int. Cl.
*G01D 7/02* (2006.01)
(52) U.S. Cl. .................................... 73/866.3
(58) Field of Classification Search ............... 73/865.9, 73/865.8, 866.3; 264/39–40.7
See application file for complete search history.

(56) References Cited

U.S. PATENT DOCUMENTS

| | | | |
|---|---|---|---|
| 5,611,975 A | 3/1997 | Kamiguchi et al. | |
| 5,800,748 A | 9/1998 | Kamiguchi et al. | |
| 5,815,397 A | 9/1998 | Saito et al. | |
| 6,031,519 A * | 2/2000 | O'Brien | 345/156 |
| 6,231,810 B1 * | 5/2001 | Tunc | 422/34 |
| 6,694,245 B2 * | 2/2004 | Minami et al. | 701/114 |

FOREIGN PATENT DOCUMENTS

| | | |
|---|---|---|
| JP | 2-026724 | 1/1990 |
| JP | 4-133712 | 5/1992 |
| JP | 5-057773 | 3/1993 |
| JP | 5-169228 | 7/1993 |
| JP | 8-207095 | 8/1996 |
| JP | 8-244087 | 9/1996 |
| JP | 2002-052590 | 2/2002 |
| JP | 2002-273773 | 9/2002 |

OTHER PUBLICATIONS

American Heritage Dictionary, 1982, definition of "dwell".*
Notice of Reasons for Rejection.
Japanese Office Action dated Feb. 28, 2006 of JP Application No. 2003-006705.

* cited by examiner

*Primary Examiner*—Robert Raevis
(74) *Attorney, Agent, or Firm*—Staas & Halsey LLP

(57) ABSTRACT

Variables such as injection pressure and injection velocity are detected at a predetermined sampling cycle for each molding cycle and the variables for a plurality of past molding cycles starting from the latest molding cycle are stored. Change patterns of the stored variables of the respective molding cycles are displayed in the form of graphs in which the first axis represents time (the number of times of sampling), the second axis represents the variable values, and the third axis represents the molding cycle.

7 Claims, 15 Drawing Sheets

FIG. 3

| S | INJECTION PRESSURE:PR | INJECTION VELOCITY: V |
|---|---|---|
| 0 | PR(0,0), PR(0,1)....PR(0,n) | V(0,0), V(0,1)....V(0,n) |
| 1 | PR(1,0), PR(1,1)....PR(1,n) | V(1,0), V(1,1)....V(1,n) |
| 2 | PR(2,0), PR(2,1)....PR(2,n) | V(2,0), V(2,1)....V(2,n) |
| ...... | ............ | ............ |
| m | PR(m,0), PR(m,1)....PR(m,n) | V(m,0), V(m,1)....V(m,n) |

FIG. 7

| S | INJECTION PRESSURE :PR | INJECTION VELOCITY :V | SCREW POSITION :PO |
|---|---|---|---|
| 0 | PR(0,0), PR(0,1)....PR(0,n) | V(0,0), V(0,1)....V(0,n) | PO(0,0), PO(0,1)...PO(0,n) |
| 1 | PR(1,0), PR(1,1)....PR(1,n) | V(1,0), V(1,1)....V(1,n) | PO(1,0), PO(1,1)...PO(1,n) |
| 2 | PR(2,0), PR(2,1)....PR(2,n) | V(2,0), V(2,1)....V(2,n) | PO(2,0), PO(2,1)...PO(2,n) |
| ... | ........ | ........ | ........ |
| m | PR(m,0), PR(m,1)...PR(m,n) | V(m,0), V(m,1)...V(m,n) | PO(m,0), PO(m,1)...PO(m,n) |

FIG. 10

| S | INJECTION PRESSURE: PR | INJECTION VELOCITY: V | TIME: T |
|---|---|---|---|
| 0 | PR(0,0), PR(0,1)....PR(0,n) | V(0,0), V(0,1)....V(0,n) | T(0) |
| 1 | PR(1,0), PR(1,1)....PR(1,n) | V(1,0), V(1,1)....V(1,n) | T(1) |
| 2 | PR(2,0), PR(2,1)....PR(2,n) | V(2,0), V(2,1)....V(2,n) | T(2) |
| ...... | ............ | ............ | |
| m | PR(m,0), PR(m,1)... PR(m,n) | V(m,0), V(m,1)....V(m,n) | T(m) |

FIG. 13

| S | INJECTION PRESSURE :PR | INJECTION VELOCITY : V | SCREW POSITION :PO | TIME:T |
|---|---|---|---|---|
| 0 | PR(0,0), PR(0,1),...PR(0,n) | V(0,0), V(0,1)...V(0,n) | PO(0,0), PO(0,1)...PO(0,n) | T(0) |
| 1 | PR(1,0), PR(1,1),...PR(1,n) | V(1,0), V(1,1)...V(1,n) | PO(1,0), PO(1,1)...PO(1,n) | T(1) |
| 2 | PR(2,0), PR(2,1),...PR(2,n) | V(2,0), V(2,1)...V(2,n) | PO(2,0), PO(2,1)...PO(2,n) | T(2) |
| ...... | ...... | ...... | ...... | |
| m | PR(m,0), PR(m,1)...PR(m,n) | V(m,0), V(m,1)...V(m,n) | PO(m,0), PO(m,1)...PO(m,n) | T(m) |

MONITOR FOR INJECTION MOLDING MACHINE

CROSS-REFERENCE TO RELATED APPLICATIONS

This application is a Divisional Application of application Ser. No. 10/749,374, filed Jan. 2, 2004, now pending, and claims the benefit of Japanese Application No. 2003-006705, filed Jan. 15, 2003, of which this application claims priority under 35 U.S.C. §120.

BACKGROUND OF THE INVENTION

1. Field of the Invention

The present invention relates to a monitor for monitoring a state of molding in an injection molding machine.

2. Description of the Related Art

States of various variables such as injecting velocity, injecting pressure, and the like during injection in an injection molding cycle can be regarded as indicators of good or bad of a molding state. Therefore, the various variables during molding are sampled and graphed on a display and molding conditions are adjusted and evaluated and stability of molding is judged based on the graphs. Especially in evaluating the stability of the molding, waveforms are drawn one upon another through a plurality of molding cycles so that how the waveform fluctuates through the respective cycles and cycle-to-cycle variation in the waveform can be grasped.

In order to grasp how the waveform fluctuates and changes through the molding cycles, order of the drawn waveforms of the molding cycles needs to be judged. However, if the waveform graphs are drawn one upon another, the waveforms overlap each other and it becomes difficult to discriminate the changes in waveforms in the molding cycles from each other. Therefore, there is a known method in which the latest waveform graph and preceding waveform graphs are drawn in different colors to discriminate the changes in the waveforms in the molding cycles over time from each other (see Japanese Patent Application Laid-open No. 2-26724, for example).

Moreover, there is also known art in which a shot number (molding cycle number) is designated on a horizontal axis (first axis), an injection start position or an amount of cushion is designated on a vertical axis (second axis), a lot is designated on a third axis, and relative relationships between three kinds of monitoring data are displayed in three dimensions (see Japanese Patent Application Laid-open No. 2002-273773, for example).

In order to judge the stability of the molding state, it is preferable that how the various variables change and vary over time in a single molding cycle can be grasped and also that the changes and variations in the variables in the molding cycles can be observed and discriminated from each other. In other words, it is preferable that changing and varying patterns of the respective variables in the single molding cycle can be grasped and that variations and changes in the patterns in the plurality of molding cycles can be discriminated from each other. In the above-described prior-art method described in the above-mentioned Japanese Patent Application Laid-open No. 2-26724 in which the molding waveform patterns are displayed in different colors, the latest waveform pattern and the past waveform patterns can be discriminated from each other based on the different colors because they are in different colors. However, the past waveform patterns are in the same color and both the past waveform patterns and the latest waveform pattern are drawn one upon another. Therefore, the waveform patterns overlap each other and it is difficult to discriminate variations, changes, and trends in the variations in the waveform patterns from each other.

In the method described in the above-mentioned Japanese Patent Application Laid-Open No. 2002-273773, the waveform patterns in lots can be compared with each other to grasp differences between the lots. However, it is impossible to grasp how the variable varies and how a waveform pattern varies and changes in a single molding cycle and to judge stability of molding.

SUMMARY OF THE INVENTION

According to the present invention, a monitor for an injection molding machine comprises sampling means for detecting, at every predetermined cycle, a variable varying in one molding cycle in an injection molding process and storing the detected variable; and means for displaying the change pattern of the variable for a plurality of molding cycles in the form of three dimensional graphs using three axes.

According to a first aspect of the invention, the displaying means displays the variable for the plurality of molding cycles in the form of graphs in which a first axis represents time, a second axis represents the variable and a third axis represents the number of molding cycles.

According to a second aspect of the invention, the sampling means detects, at every predetermined cycle, at least the position of a movable member and one or more other variables and stores these variables, and the displaying means displays the variables for a plurality of molding cycles in the form of graphs in which a first axis represents the position of the movable member, a second axis represents the above-mentioned other variables and a third axis represents the number of molding cycles.

According to a third aspect of the invention, the monitor further comprises means for storing a time at a predetermined timing in each molding cycle. And, the displaying means displays the variable for a plurality of molding cycles in the form of graphs in which a first axis represents time, a second axis represents the variable and a third axis represents the time.

According to a fourth aspect of the invention, the monitor further comprises means for storing a time at a predetermined timing in each molding cycle. The sampling means detects, at every predetermined cycle, at least the position of a movable member and one or more other variables and stores these variables. And, the displaying means displays the variables for a plurality of molding cycles in the form of graphs in which a first axis represents the position of the movable member, a second axis represents the variables and a third axis represents the time.

The first to fourth aspects of the invention may adopt the following forms.

The sampling means is provided in the injection molding machine (e.g., in a controller) or in an external device (e.g., a computer) connected to the injection molding machine.

The graphically displaying means is provided in the injection molding machine (e.g., in a controller) or in an external device (e.g., a computer) connected to the injection molding machine.

The variable is a difference between a sampled variable and a reference variable which is a variable in a specific molding cycle.

The variables varying in one molding cycle in the injection molding process include one of injection pressure, injection velocity, a screw position, screw rotation speed, back pressure, motor torque, a mold opening/closing position/speed, an ejector position/speed, and temperatures of a cylinder or a nozzle.

According to the invention, there is provided the monitor of the injection molding machine which can judge molding states including stability of molding.

BRIEF DESCRIPTION OF THE DRAWINGS

The above and other objects and features of the present invention will become apparent from the following description of the embodiments by reference to the drawings in which:

FIG. 3 is an explanatory view of a table in which the sampling data obtained by the processing in FIG. 2 are stored;

FIG. 7 is an explanatory view of a table in which the sampling data obtained by the processing in FIG. 6 are stored;

FIG. 10 is an explanatory view of a table in which the sampling data obtained by the processing in FIG. 9 are stored;

FIG. 13 is an explanatory view of a table in which the sampling data obtained by the processing in FIG. 12 are stored;

DESCRIPTION OF THE EMBODIMENTS

Figure 1:
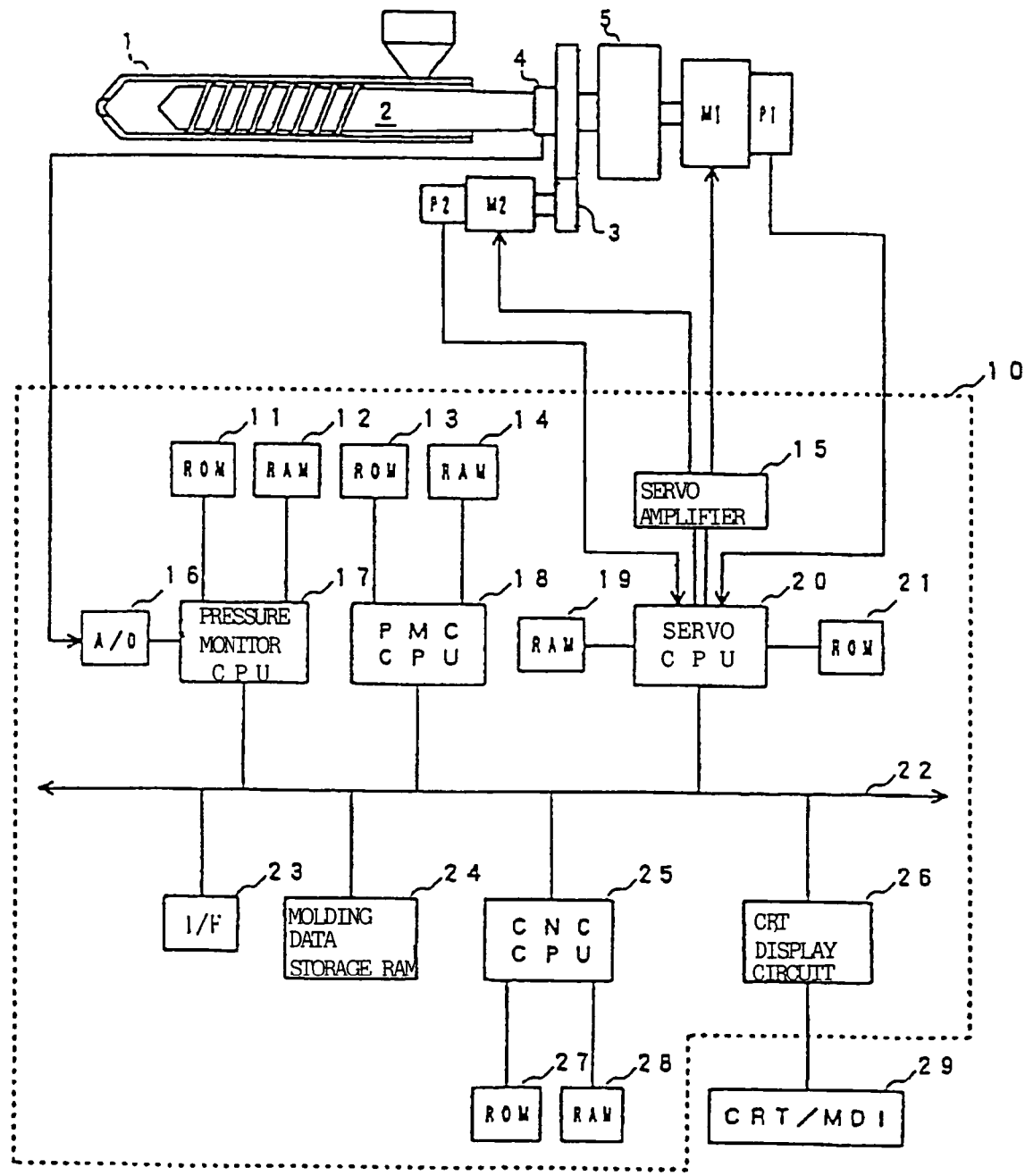
FIG. 1 is a block diagram of an essential portion of a controller of an injection molding machine, which forms a monitor in each embodiment of the invention, and an essential portion of the injection molding machine.

FIG. 1 is a block diagram of an essential portion of a controller of an injection molding machine, which forms a monitor in each embodiment of the invention, and an essential portion of the injection molding machine A reference numeral 1 designates an injection cylinder of the injection molding machine and 2 designates a screw. The screw 2 is driven in a direction of an injection axis by an injection servo motor M1 through a driving converter 5 for converting a rotational motion into a linear motion in the direction of the injection axis and is rotated for metering by a screw rotating servo motor M2 through a transmission mechanism 3. A pressure detector 4 is provided at a base portion of the screw 2 to detect pressure of resin acting in an axial direction of the screw 2, i.e., injection pressure in an injection process and screw back pressure in metering and kneading process. The injection servo motor M1 is provided with a position/velocity detector P1 such as an encoder for detecting a position of the screw 2 and an injection velocity which is a velocity of movement of the screw 2. The screw rotating servo motor M2 is provided with a speed detector P2 for detecting a rotation speed of the screw 2.

The controller 10 of the injection molding machine includes a CNC CPU 25 which is a microprocessor for numerical control, a PMC CPU 18 which is a microprocessor for a programmable controller, a servo CPU 20 which is a microprocessor for servo control, and a pressure monitoring CPU 17 of a microprocessor for sampling injection pressure and screw back pressure through an A/D converter 16. By selecting mutual input and output via a bus 22, information can be conveyed between the respective microprocessors.

To the PMC CPU 18, a ROM 13 for storing a sequence program for controlling a sequence operation of the injection molding machine, a program for monitor data displaying processing, and the like and a RAM 14 used for temporarily storing operation data and the like are connected. On the other hand, to the CNC CPU 25, a ROM 27 for storing a program for controlling the whole injection molding machine and the like and a RAM 28 used for temporarily storing operation data and the like are connected.

To the servo CPU 20 and the pressure monitor CPU 17, a ROM 21 for storing a control program written specifically for servo control, a RAM 19 for temporarily storing data, a ROM 11 for storing a control program related to sampling processing for obtaining pressure data and the like, and a RAM 12 used for temporarily storing data are connected. Furthermore, to the servo CPU 20, a servo amplifier 15 for driving servo motors of respective axes for mold clamping, an ejector (not shown), injection, and screw rotation based on a command from the CPU 20 is connected. Respective outputs from the position/velocity detector P1 provided to the injection servo motor M1 and the speed detector P2 provided to the screw rotating servo motor M2 are fed back to the servo CPU 20. A current position and the injection velocity (screw moving velocity) of the screw 2 calculated by the servo CPU 20 based on a feedback signal from the position/velocity detector P1 and a rotation speed of the screw 2 detected by the speed detector P2 are stored in a current position storage register and a current velocity storage register provided to the RAM 19.

To an interface 23, an external personal computer and the like can be connected. A manual data input unit 29 with a display is connected to the bus 22 via a CRT display circuit 26 to select a monitor display screen and a function menu item and to carry out input operation of various data and is provided with numerical keys for inputting numerical data, various function keys, and the like.

A RAM 24 for storing molding data is formed of non-volatile memory and stores molding conditions (injection/dwell conditions, metering conditions, and the like), various set values, parameters, macro variables, and the like related to injection molding operation.

With the above structure, the CNC CPU 25 distributes pulses to the servo motors of the respective axes based on a control program of the ROM 27 and the servo CPU 20 carries out servo controls such as a position loop control, a velocity loop control, a current loop control, and the like similarly to the prior art to execute so-called digital servo processing based on movement commands pulse-distributed to the respective axes and a feedback signal of a position and a feedback signal of a speed detected by detectors such as the pulse coder P1 and the speed detector P2.

In the present embodiment, the pressure monitor CPU 17 repeatedly executes sampling processing in every injection/dwell process, reads injection pressure acting on the screw 2 through the pressure detector 4 and the A/D converter 16, and reads an injection velocity and a screw position stored in the current velocity storage register and the current position storage register of the memory 19 to store them in the RAM 12.

Figure 2:
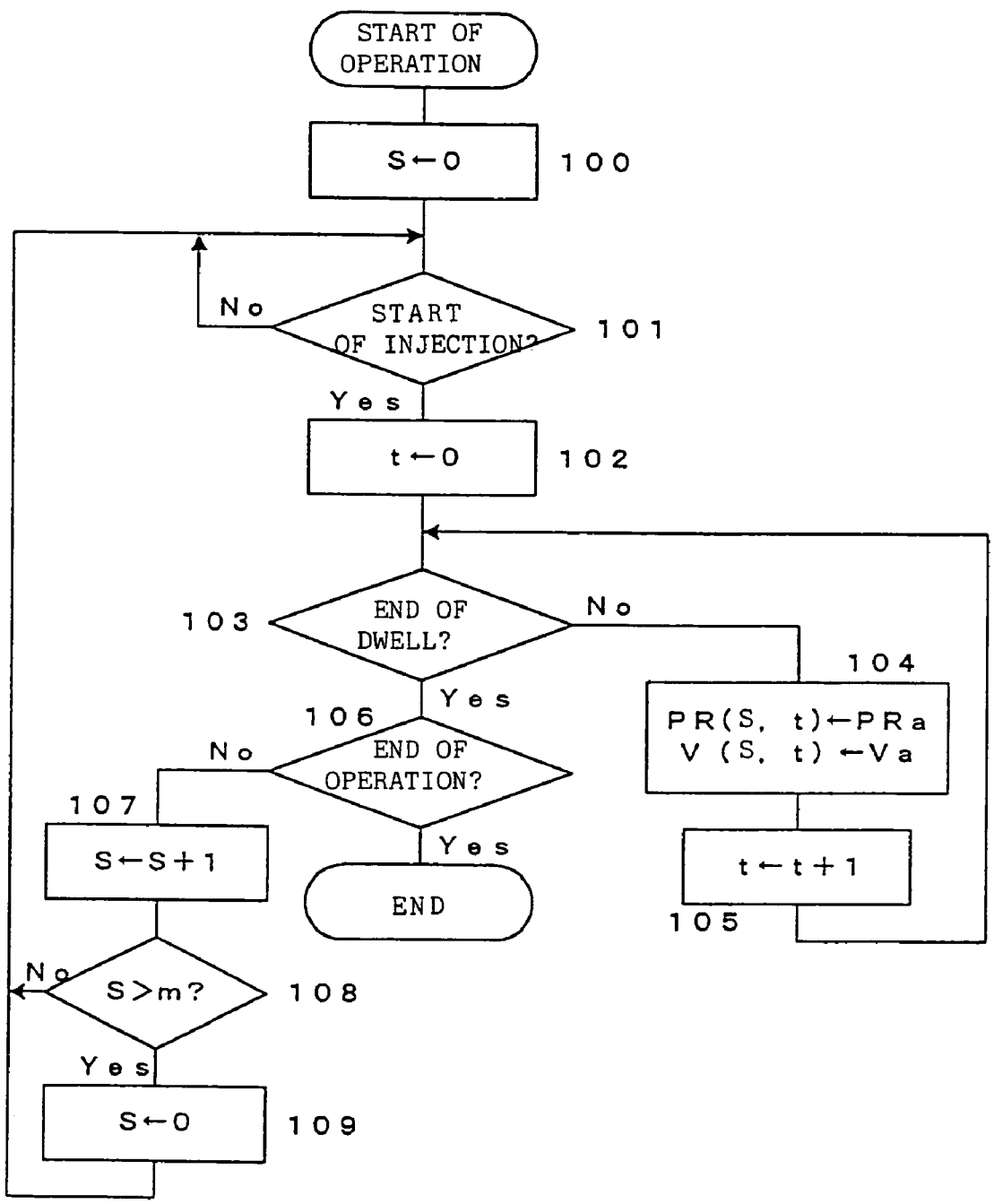
FIG. 2 is a flow chart of monitor data obtaining processing in a first embodiment of the invention.

FIG. 2 is a flow chart of monitor data obtaining processing performed by the pressure monitor CPU 17 in the first embodiment. In this embodiment, an injection pressure PR and an injection velocity V are detected as monitor data at every predetermined sampling cycle.

If operation starts, a shot counter S for counting the number of molding cycles (number of shots (injections)) at "0" (step 100). If the injection starts (step 101), a sampling counter t for counting the number of sampling is set at "0" (step 102) and whether dwell process has finished or not is judged (step 103). If dwell process has not been finished, a current injection pressure PRa detected from a load cell and a current injection velocity Va detected from the position/velocity detector are respectively stored in a table provided in the RAM 12 as PR (S, t) and V (S, t), respectively, in association with values of the shot counter S and the sampling counter t (step 104).

The table provided in the RAM 12 is a table for cyclically storing sampling data of (m+1) times molding cycles as shown in FIG. 3 and stores the sampling data in accordance with the shot counter S.

Next, the sampling counter t is incremented by 1 (step 105) and the processing returns to step 103. From then on, the processings from steps 103 to 105 are repeatedly executed at every predetermined sampling cycle until the dwell process ends and the sampled injection pressure PR (S, t) and injection velocity V (S, t) are stored in the table as shown in FIG. 3.

If the dwell process ends, whether an operation end command has been input or not is judged (step 106). If the operation is not ended, the shot counter S is incremented by 1 (step 107) and whether or not the value of the shot counter S is greater than a set number m to be stored is judged (step 108). If the value is not greater than the set number, the processing returns to step 101. On the other hand, if the value is greater than the set number m, the shot counter S is set at "0" (step 109) and the processing returns to step 101.

From then on, the above processings from step 101 to 109 is repeatedly executed until the operation ends. Thus, the injection pressure PR (S, t) and the injection velocity V (S, t) which are sampling data for respective shots are cyclically stored for (m+1) times molding cycles in the table as shown in FIG. 3.

Figure 4:
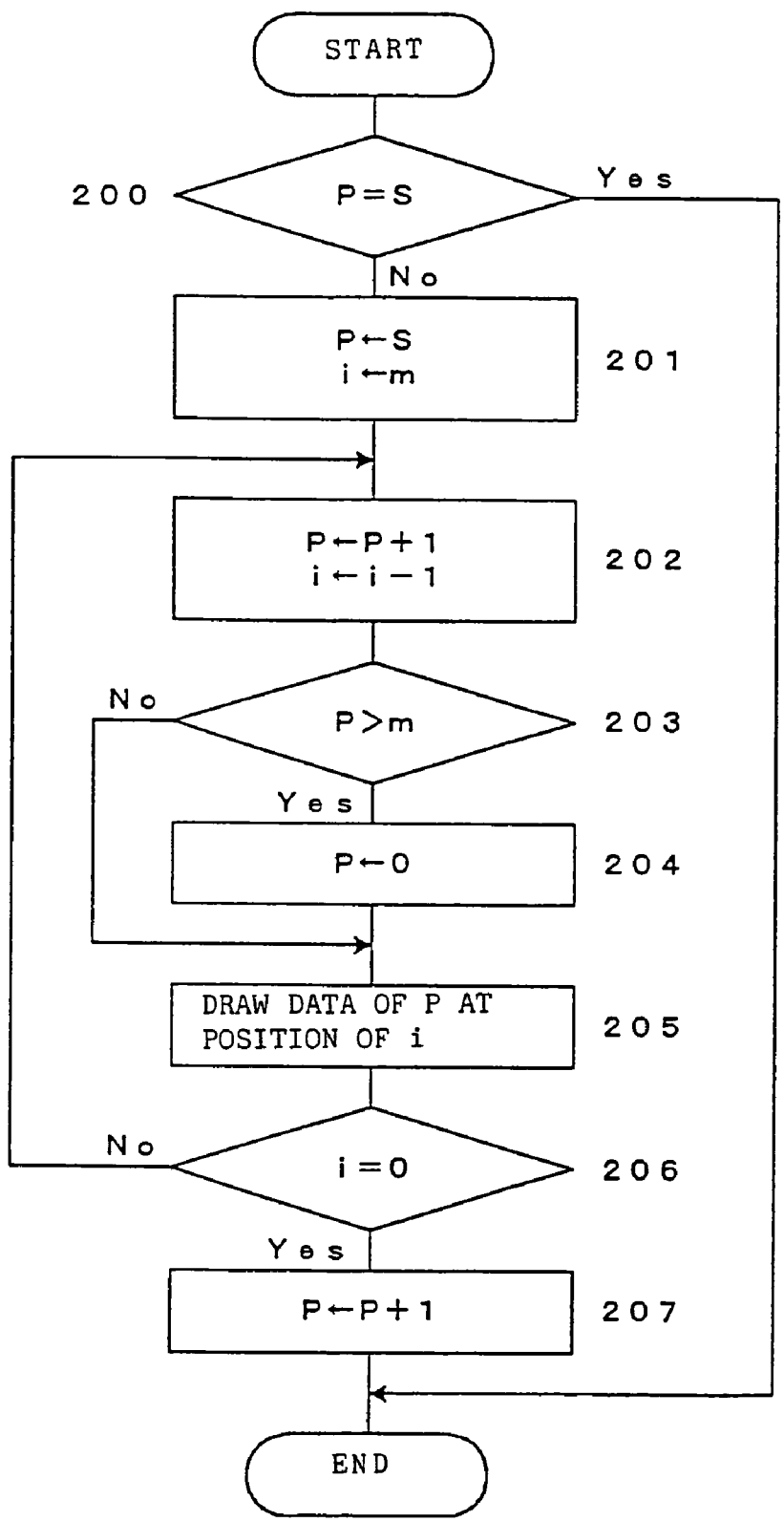
FIG. 4 is a flow chart of displaying processing of the sampling data stored in the table in FIG. 3.

On the other hand, if a monitor display command is input, the PMC CPU 18 executes display processing in FIG. 4 at every predetermined cycle.

First, whether or not a value of a pointer P agrees with the shot counter S is judged (step 200). This is for judging whether or not the pointer P is pointing a molding cycle at which sampling data is being taken currently. If the value agrees with the shot counter S, that means the sampling data is being rewritten. In consequence, the processing of this cycle is finished. If the value does not agree with the shot counter S, the value of the shot counter S is stored in the pointer P and an index i is set at the set number m (step 201).

Next, 1 is added to the pointer P and the index i is decremented by 1 (step 202). Whether or not the value of the pointer P has exceeded the set number m as a result of the processing at step 202 is judged (step 203). If the value is greater than the set value m, "0" is set to the pointer P (step 204) and the processing proceeds to step 205. If the value of the pointer P is not greater than the set value m, the processing proceeds from step 203 to step 205. By this processing, the oldest stored sampling data is designated.

Figure 5:
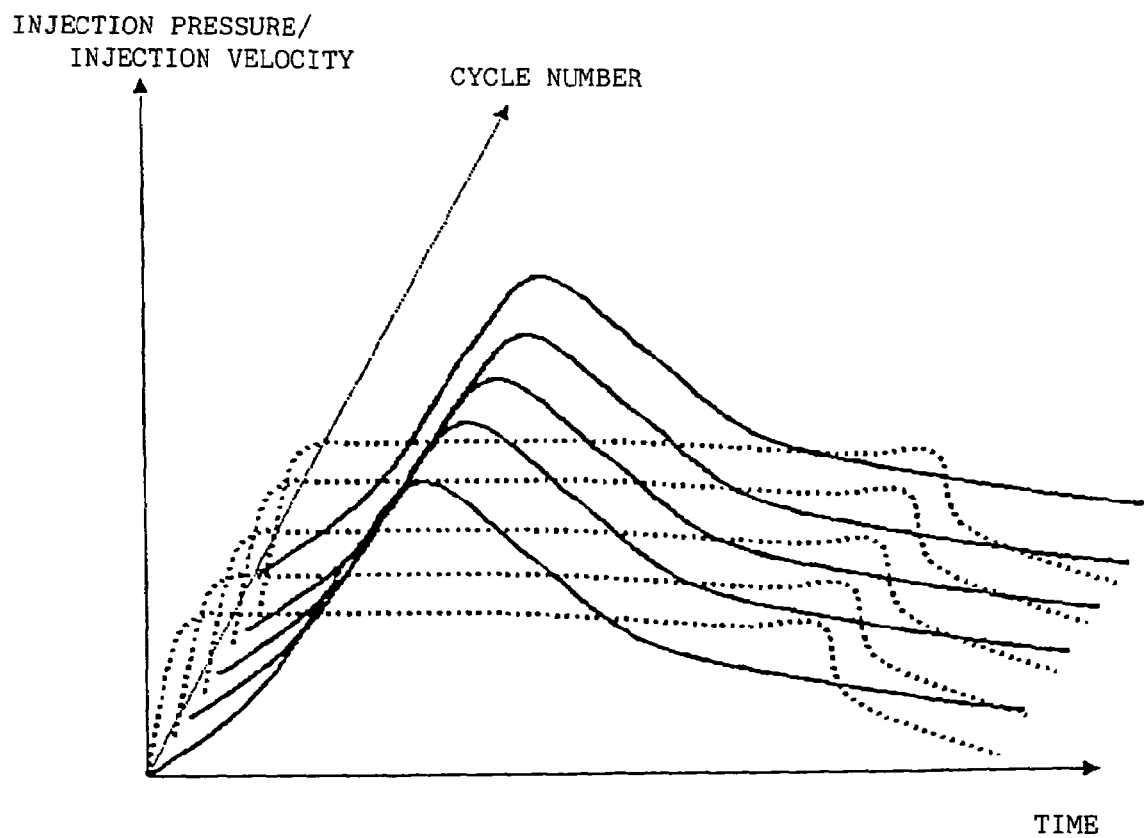
FIG. 5 shows an example of a screen on which monitor data are displayed by the displaying processing in FIG. 4.

In step 205, as shown in FIG. 5, in a coordinate system in which time is designated on a first axis, injection pressure and injection velocity are designated on a second axis, and the molding cycle number (shot number) is designated on a third axis, sampling data of the injection pressure and injection velocity pointed by the pointer P are plotted at a position on the third axis, which represents cycle number (shot number) indicated by the index i, in association with the sampling number (time) on the first axis and are graphically displayed (step 205). In this case, the injection pressure and the injection velocity are displayed in a solid line and a broken line or in difference colors as shown in FIG. 5 so that the graphs of the injection pressure and the injection velocity can be distinguished from each other.

Then, whether the value of the index i is "0" or not is judged (step 206). If it is not "0", the processing returns to step 202. From then on, the processings from step 202 to step 206 are repeatedly executed until the value of the index i becomes "0". Then, when the value of the index i becomes "0", sampling data displaying processing finishes.

By the above-described-processing, sampling data at a molding cycle which is m cycles before a current shot in which injection is in progress and sampling data are being obtained are graphically displayed at a position of (m−1) on the third axis and sampling data at a molding cycle (shot) immediately before the current cycle (shot) are graphically displayed at a position of "0" (i=0) on the third axis.

For example, if m=5, sampling data of 6 molding cycles from S=0 to 5 are to be cyclically stored in the table, and the value of the shot counter S is "2", the sampling data of P=P+1=S+1=2+1=3 stored in the table are the oldest sampling data of a shot which is m cycles before a current one and these sampling data are first displayed at a position of i=m−1=5−1=4. Then, because the pointer P is incremented by 1 and the index i is decremented by 1 in step 202, sampling data of P=4(=S) are next displayed at a position of i=3 on the third axis and then sampling data of P=5(=S) are displayed at a position of i=2 on the third axis. Next, because P=6 at step 202, P=0 by steps 203 and 204 and sampling data of P=0 (=S) are displayed at a position of i=1 on the third axis. Lastly, sampling data of P=1 (=S) are displayed at a position of i=0 on the third axis.

In the above manner, from sampling data of S=4 pointed by the pointer P=4 and which are currently being rewritten, stored sampling data are displayed in an order from the oldest one to later ones in positions of i=4, 3, 2, 1, and 0 on the third axis.

Thus, when graphic display of the m sampling data stored in the table, excluding the sampling data which is currently being written, ends, the processing proceeds from step 206 to step 207 where the pointer P is incremented by 1 to finish the processing at the present cycle. By incrementing the pointer P by 1, the value of the pointer P becomes equal to a current value of the shot counter S indicating a shot in which sampling data are currently being rewritten.

Then, if obtaining of the sampling data has finished, the value of the shot counter S is rewritten by the processings at steps 107 and 109 in FIG. 2, and the value of the pointer P does not agree with the value of the shot counter S at step 200, the processings in step 201 and the following steps are executed again and sampling data in the latest m shots are graphically displayed as shown in FIG. 5.

In FIG. 5, the injection pressure PR and the injection velocity V, which are variables in the molding cycle, are graphically displayed of change patterns with respect to time and it is possible to easily grasp how the variable varies and changes in each the molding cycle by using single change pattern. Moreover, because the change patterns of the variable of the respective molding cycles are drawn in parallel to each other in a direction of the third axis, it is possible to easily grasp cycle-to-cycle variation in the change pattern of the variable and to easily judge stability of molding.

Figure 6:
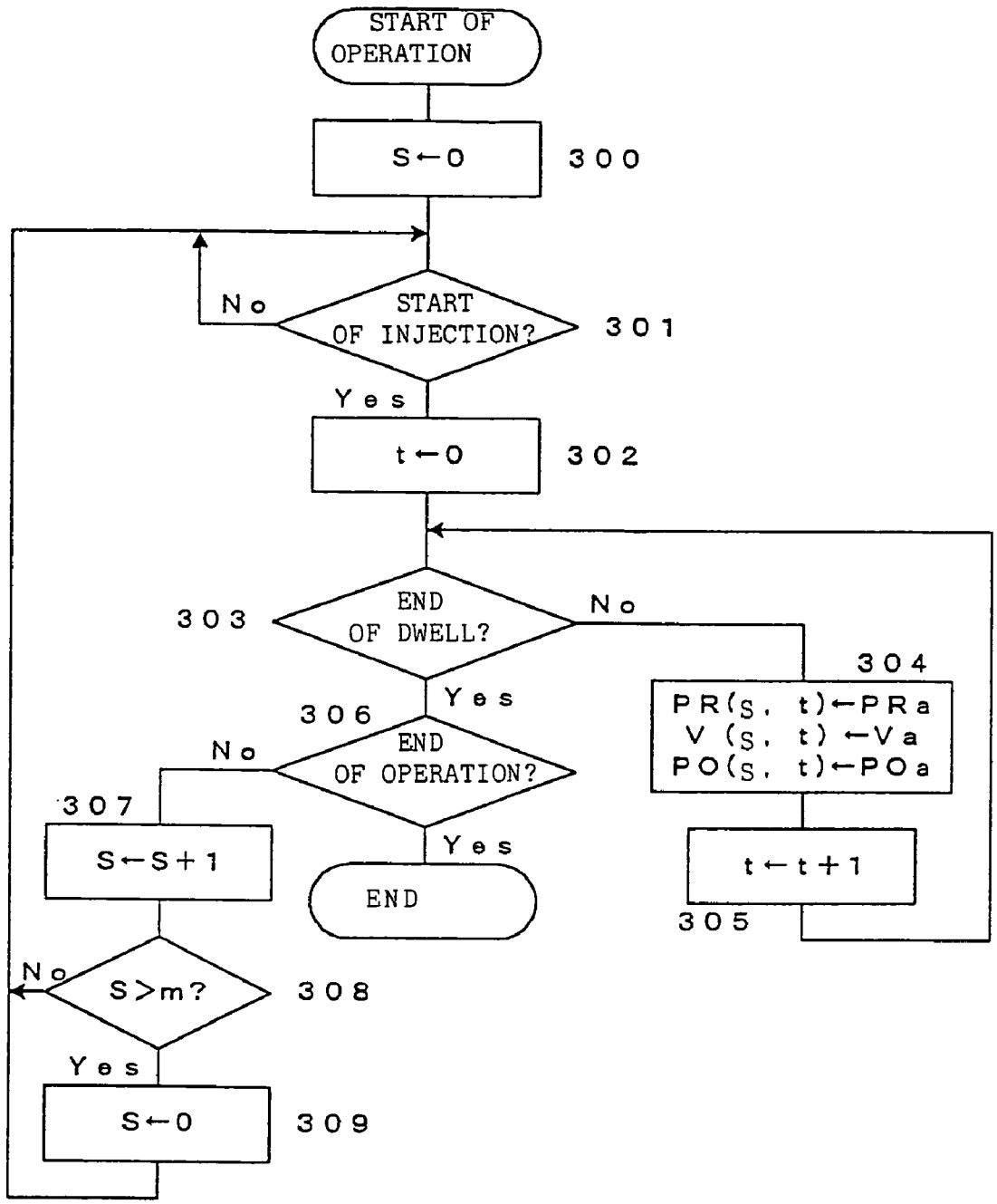
FIG. 6 is a flowchart of monitor data obtaining processing in a second embodiment of the invention.

FIG. 6 is a flow chart of sampling data obtaining processing in a second embodiment of the invention. The second embodiment is different from the first embodiment in that a screw position PO is also sampled as monitor data.

If comparison is made between the sampling data obtaining processing shown in FIG. 6 and the sampling data obtaining processing in the first embodiment shown in FIG. 2, steps 300 to 309 correspond to steps 100 to 109 and processing in FIG. 6 is the same as that in FIG. 2 except that processing at step 304 and processing at step 104 are different from each other. In the second embodiment, the screw position POa stored in the current position storage register of RAM 19 is also obtained at step 304 where data is obtained. The injection pressure PRa, the injection velocity Va, and the screw position POa are obtained at every predetermined sampling cycle and stored in a table provided to the RAM 12 and shown in FIG. 7.

Because the screw position POa is merely added as the sampling data as compared with the first embodiment, detailed description of the processing shown in FIG. 6 will be omitted.

Although monitor data displaying processing in the second embodiment is mostly similar to the displaying processing in the first embodiment shown in FIG. 4, the processing at step 205 is different and the other processings are the same.

Figure 8:
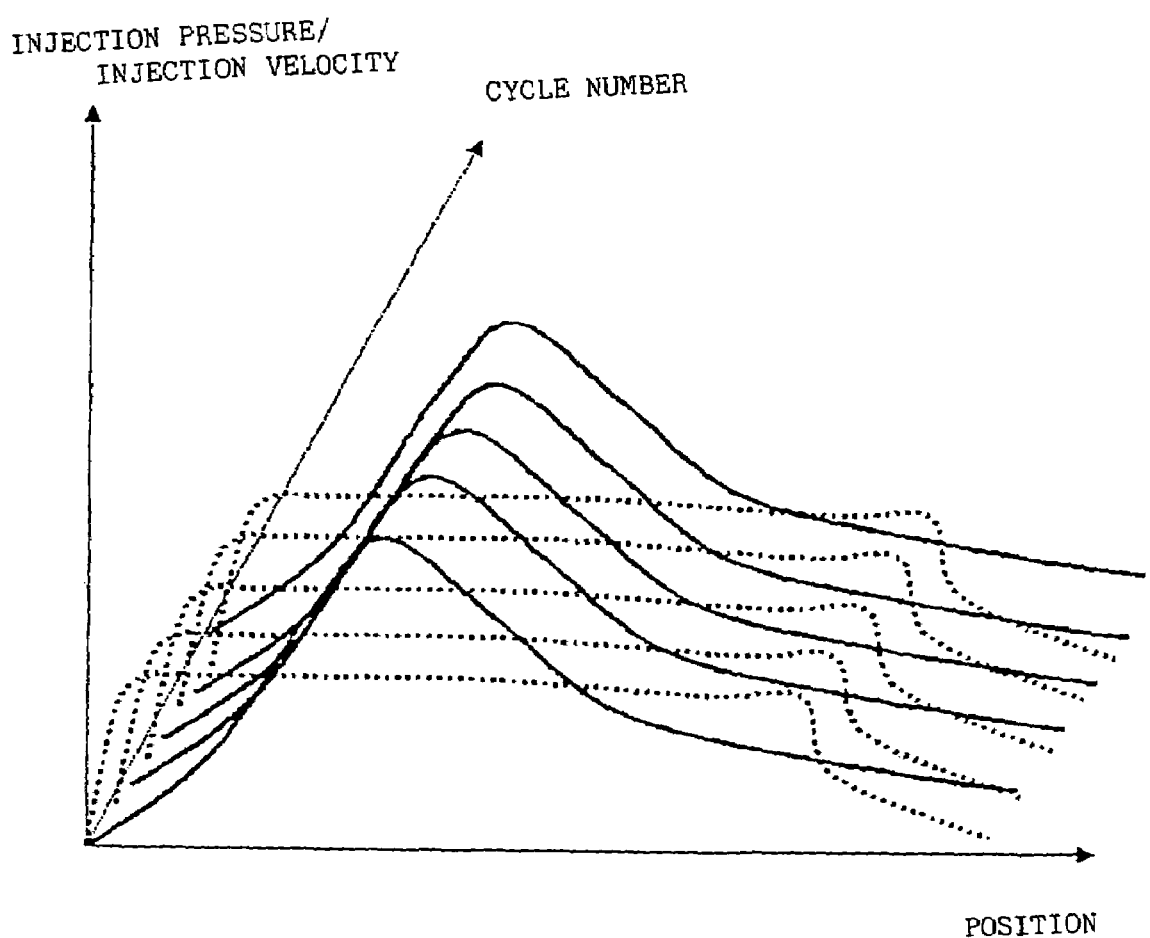
FIG. 8 shows an example of a screen on which sampling data stored in the table in FIG. 7 are displayed.

Although the first axis represents time (the number of times of sampling) in the processing at step 205 in the first embodiment, the first axis is displayed as an axis representing the screw position PO in the second embodiment. As shown in FIG. 8, the first axis represents the screw position PO, the second axis represents the injection pressure PR and the injection velocity V, and the third axis represents the molding cycle number, i.e., the shot number. Then, the injection pressure PR and the injection velocity V corresponding to the screw position PO in each sampling at every molding cycle (shot) and stored in the table shown in FIG. 7 are plotted, and patterns of the injection pressure and the injection velocity corresponding to the screw position are displayed so that the later molding cycle (shot) is closer to the front (closer to an origin point of the coordinate system) as shown in FIG. 8.

Figure 9:
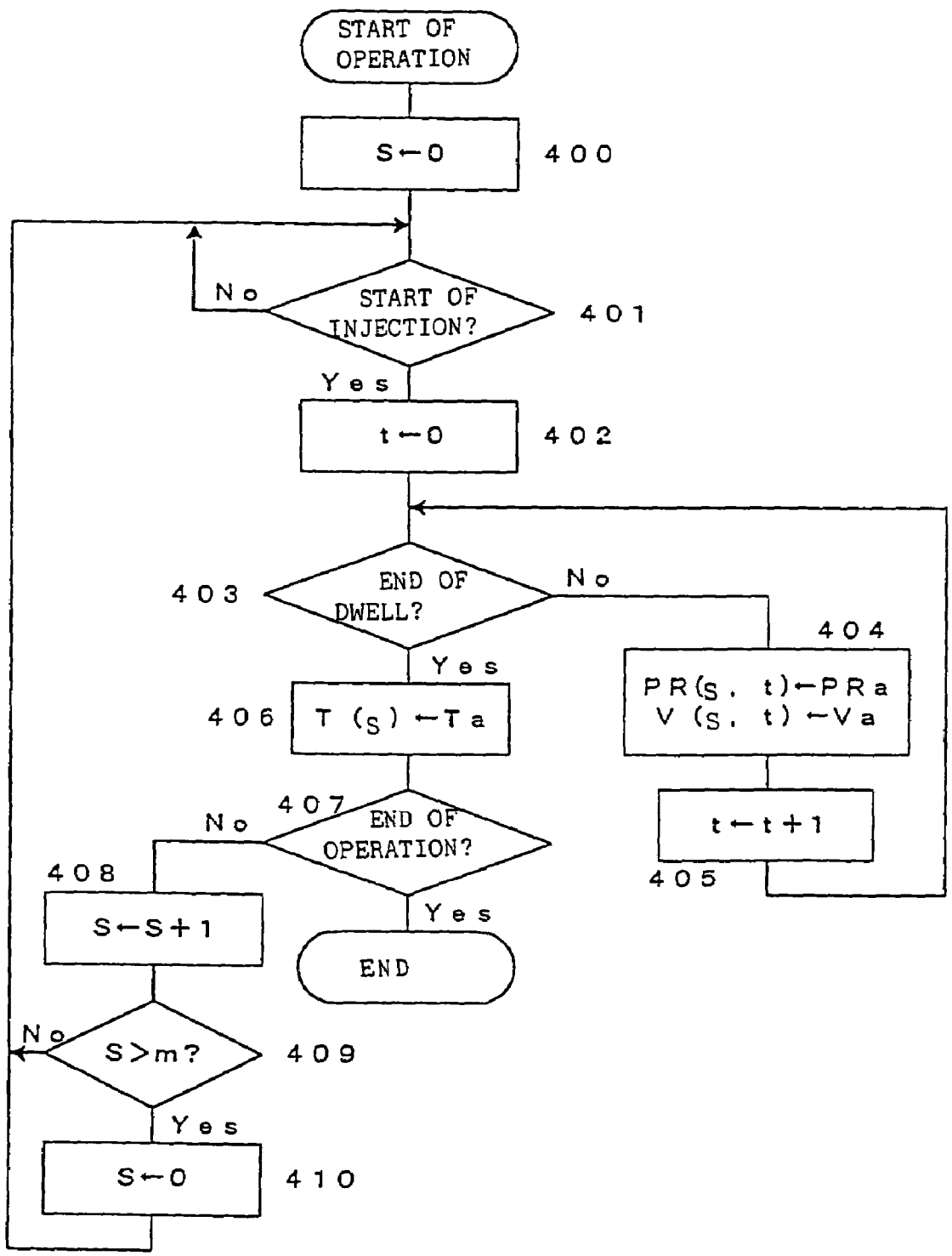
FIG. 9 is a flowchart of monitor data obtaining processing in a third embodiment of the invention.

FIG. 9 is a flowchart of sampling data obtaining processing in the third embodiment of the invention. In the third embodiment, data to be obtained as sampling data are injection pressure PR and injection velocity V at every shot and are similar to those in the first embodiment. However, the third embodiment is different from the first embodiment in that a time of a predetermined timing (for example, time when dwell process ends) in the molding cycle is stored. In other words, if comparison is made between the flow chart of the sampling data obtaining processing shown in FIG. 9 and the flow chart of the first embodiment and shown in FIG. 2, it is apparent that the third embodiment is different from the first embodiment only in that a time Ta is stored in a reading table at step 406 after dwell process has finished. The other processings are the same.

Then, in the third embodiment, the injection pressure PR, the injection velocity V and the time T at every predetermined sampling cycle are stored at every shot in the table as shown in FIG. 10.

Figure 11:
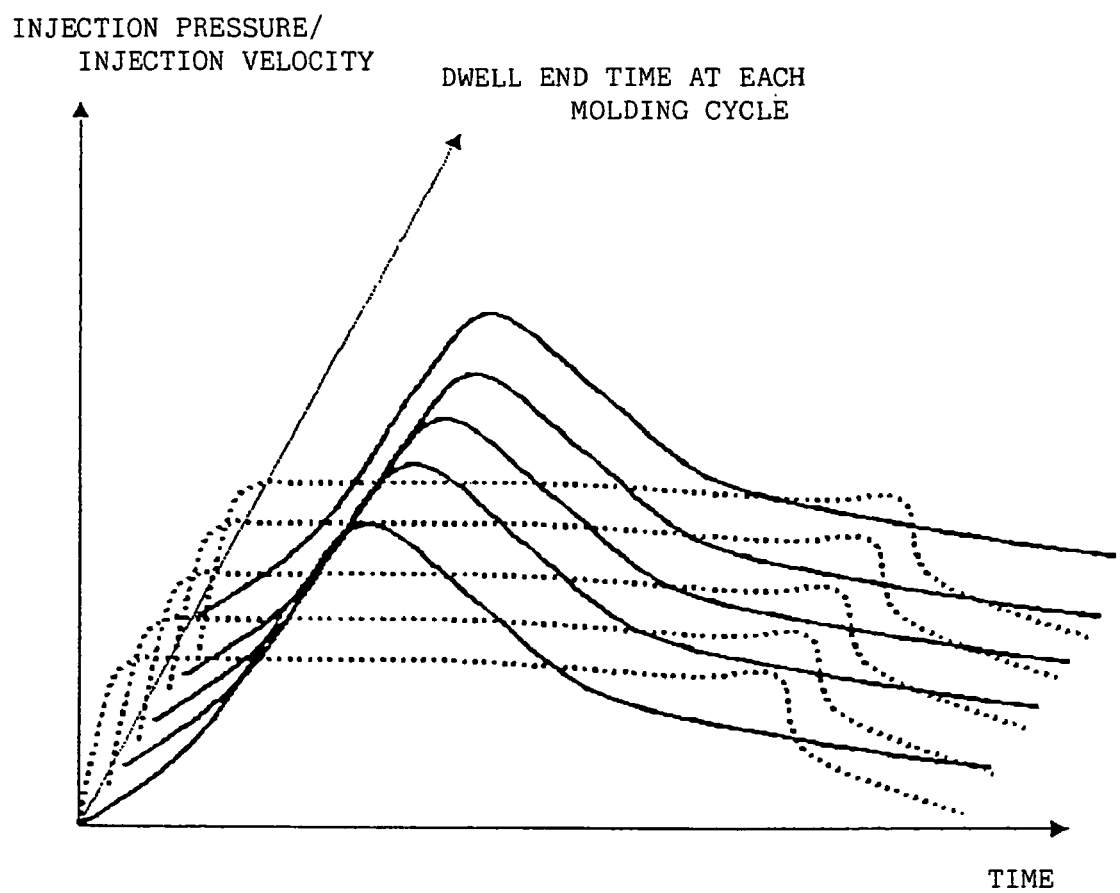
FIG. 11 shows an example of a screen on which sampling data stored in the table in FIG. 10 are displayed.

Although the monitor data displaying processing in the third embodiment is mostly similar to the displaying processing in the first embodiment shown in FIG. 4, the processing at step 205 is different and the other processings are the same. In the third embodiment, as shown in FIG. 11, a first axis represents the sampling time, a second axis represents the injection pressure PR and the injection velocity V, a third axis represents a dwell end time T in each the molding cycle, and patterns of the injection pressure PR and the injection velocity V with respect to time are drawn at a position on the third axis corresponding to the dwell end time T stored in the table.

In a case of the third embodiment, in the processing at step 205, a position corresponding to a value obtained by subtracting a time of the present molding cycle stored in the table from a current time is the position on the third axis (position of i at step 205) where the sampling data in the molding cycle are drawn.

Figure 12:
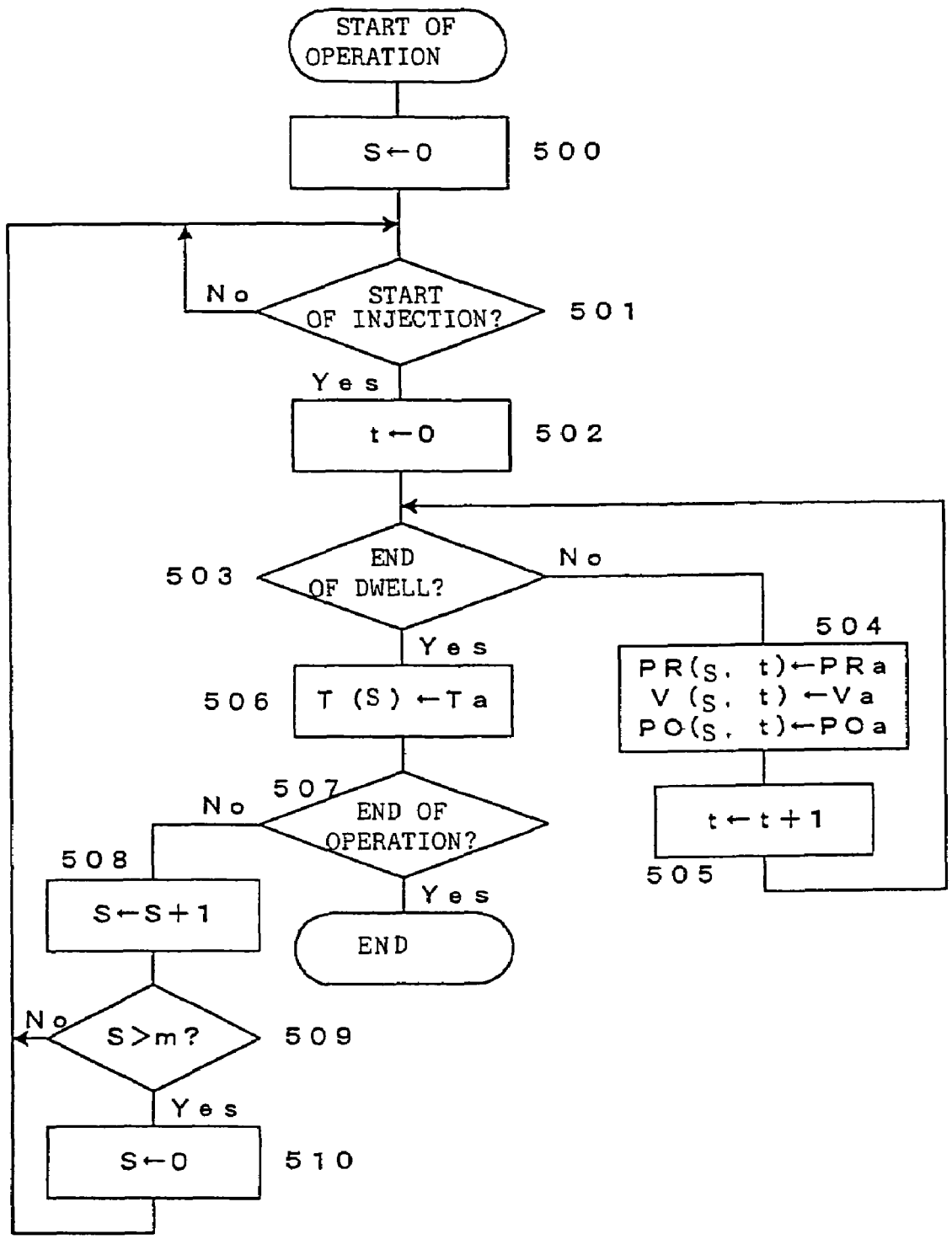
FIG. 12 is a flow chart of monitor data obtaining processing in a fourth embodiment of the invention.

FIG. 12 is a flow chart of sampling data obtaining processing in the fourth embodiment of the invention. The fourth embodiment is different from the third embodiment only in that the screw position PO is also obtained as sampling data. In other words, only processing at step 504 is different from the processing at step 404. Because the other processings are the same, description of the processing shown in FIG. 10 will be omitted.

In a case of the fourth embodiment, the injection pressure PR, the injection velocity V, the screw position PO, and the dwell end time Tat every sampling time are stored at every molding cycle (every shot) in the table provided to the RAM 12 as shown in FIG. 13.

Figure 14:
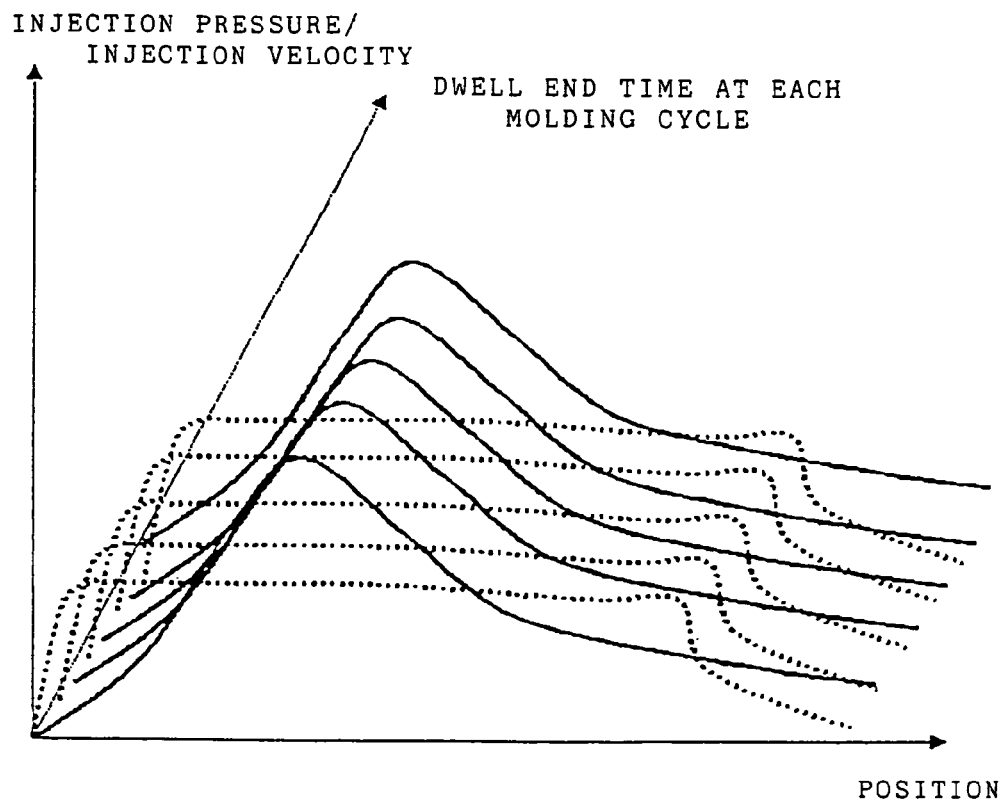
FIG. 14 shows an example of a screen on which sampling data stored in the table in FIG. 13 are displayed.

In the monitor data displaying processing in the fourth embodiment, the first axis represents the screw position, the second axis represents the injection pressure PR and the injection velocity V, the third axis represents the dwell end time Tin each molding cycle as shown in FIG. 14, and the injection pressure PR and the injection velocity V are plotted at a position on the third axis corresponding to the dwell end time T stored in the table, in association with the screw position PO, so that the patterns of the injection pressure PR and the injection velocity V with respect to the screw position PO are drawn.

Although the variables (such as injection pressure, injection velocity, screw position) are detected at each molding cycle and graphically displayed in the above-described respective embodiments, it is also possible to store the sampling data of the variables of one molding cycle in the table at every predetermined number of molding cycles and at intervals of the predetermined number of molding cycles and to display the graphs based on the stored data and at intervals of the predetermined number of molding cycles. If the data are displayed for every process such as injection, dwell, metering, and the like, timings of storing times are preferably start time or end time of each the process and it is possible to automate selection of the timing. Moreover, it is possible that the monitor data obtaining processing is started and finished by operation by an operator.

Although data to be sampled as monitor data are injection pressure, injection velocity, screw position and dwell end time in the above-described embodiment, it is also possible that other variables such as screw rotation speed, back pressure, motor torque, mold opening/closing position/speed, ejector position/speed, and temperatures of a cylinder and a nozzle are sampled as monitor data and displayed in three dimensions as described above. The timings of storing times may be when the injection starts, the cycle starts, or closing of the mold starts. Furthermore, as a time to be stored, not only a time obtained from a clock but also a time which has elapsed from a specific time such as a time of turning on of the power may be used.

In displaying, it is possible that the displayed three-dimensional coordinate system can be rotated.

Moreover, a variable in a specific cycle may be employed as a reference variable and the variable displayed as a graph may be a difference between a sampled variable and the reference variable. For example, if the reference specific cycle is the oldest cycle in the stored cycles and a variable in this cycle is employed as a reference variable, a reference pointer for pointing the reference cycle is provided and "S+1" is stored in the pointer to set the oldest cycle in the stored cycles at step 201 in FIG. 4 ("0" is stored in the reference pointer when S+1 is greater than the set number m). Then, at step 205, a difference is obtained by subtracting a variable of corresponding sampling data in a cycle stored in the reference pointer from sampling data in the cycle pointed by the pointer P and this difference may be displayed.

It is also possible that a variable of sampling data at a specific cycle employed as a reference cycle is set as reference data and stored in advance and that a difference between a variable at each sampling and a corresponding variable at the reference sampling is obtained and displayed, at step 205.

Figure 15:
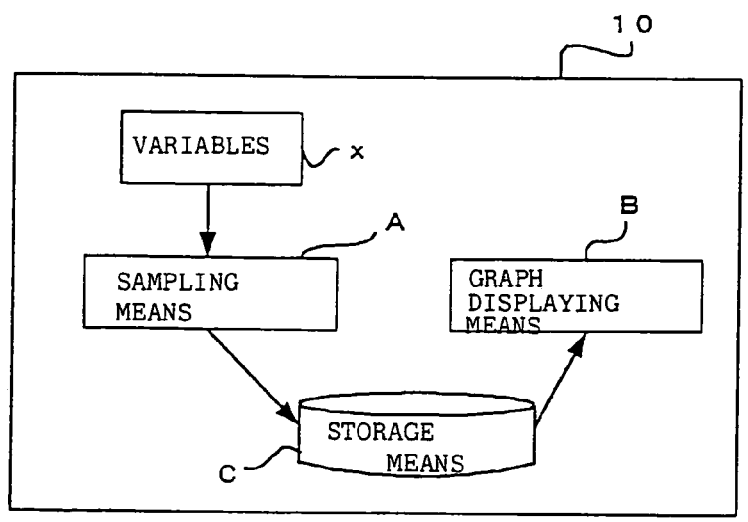
FIG. 15 shows an example in which the monitor for the injection molding machine according to the invention is provided in the controller for the injection molding machine.

In the above-described embodiment, the monitor is formed of a controller 10 itself of the injection molding machine and all of means A for sampling respective variables x, means B for displaying graphs, and means C for storing variable data sampled at each molding cycle (shot) are provided in the controller for controlling an injection molding machine. Schematic illustration of this form is as shown in FIG. 15.

Figure 16:
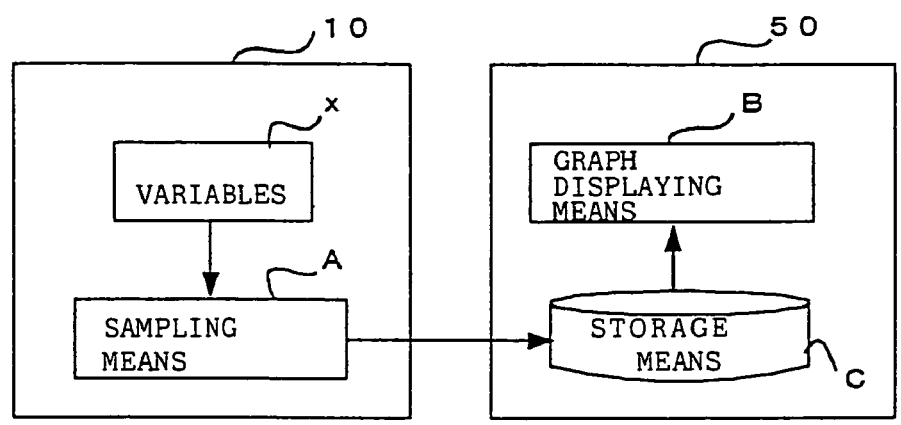
FIG. 16 shows an example in which sampling means of the monitor for the injection molding machine according to the invention is provided in the controller for the injection molding machine and sampling data storage means and graph displaying means of the monitor are provided in a personal computer.

On the other hand, it is also possible that the means A for sampling the various variables x is provided in the controller 10 of the injection molding machine and that the means C for storing the sampling data and the means B for displaying the graphs are provided in a personal computer 50 so as to perform processings such as summarization and editing of the sampled data. FIG. 16 is a schematic diagram of this form.

In a case of this form, the personal computer 50 is connected through the interface 23 provided to the controller 10 of the injection molding machine. The pressure monitor CPU 17 forming the sampling means A samples the variables (such as injection pressure and injection velocity) at each molding cycle (shot), stores them in the RAM 12, and transfers them every time the molding cycle (shot) ends or transfers data for the predetermined number of shots at a time at every predetermined number of shots to the personal computer 50 through the interface 23. On the other hand, the personal computer 50 is provided with the table as shown in FIGS. 3, 7, 10, and 13 and stores the received sampling data of the various variables x for each the molding cycle. Then, the personal computer 50 displays the stored sampling data in three dimensions. By employing the form shown in FIG. 16, sampling data of various variables x in a plurality of injection molding machines may be stored in a concentrated manner in storage means provided to a computer of a central controller and the sampling data of the respective injection molding machines may be graphically displayed so that molding states of a plurality of injection molding machines can be monitored in a concentrated manner.

Figure 17:
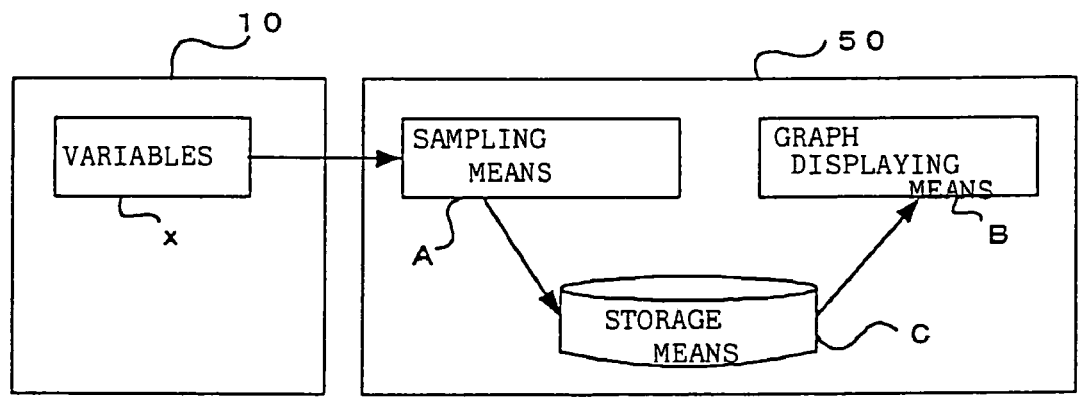
FIG. 17 shows an example in which the monitor for the injection molding machine according to the invention is provided in a personal computer connected to the injection molding machine.

Furthermore, as shown in FIG. 17, it is also possible that the sampling means A, the graph displaying means B, and the storage means C for storing the sampling data are provided to the personal computer. In this case, means for detecting variables of the injection molding machine and the personal computer 50 need be connected to each other. For example, if injection pressure PR, injection velocity V and screw position PO are to be sampled as variables x, a pressure detector 4 and a position/velocity detector P1 are connected to a personal computer 50 and the injection pressure PR, the injection velocity V and the screw position PO, detected by these pressure detector 4 and the position/velocity detector P1, are detected by the personal computer 50 at every predetermined cycle, stored in the storage means as in the above-described first to fourth embodiments, and graphically displayed.

As described above, according to the present invention, various variables indicating molding states at respective molding cycles are graphically displayed as waveforms with respect to time and screw position, along an axis representing the molding cycle, in three dimensions. As a result, it is possible to easily and visually grasp how the change patterns of variables (change waveforms of variables) vary through the molding cycles. Therefore, it is easy to judge the stability of the molding.

The invention claimed is:

1. A monitor for an injection molding machine, comprising:
    sampling means for detecting, in each of successive molding cycles a molding cycle variable, varying in each molding cycle in an injection molding process, and storing the detected variable; means for storing an end of cycle time for each molding cycle; and
    means for graphically displaying the detected variables for a plurality of molding cycles, with a first axis representing time, a second axis representing said detected variables and a third axis representing said molding cycles.

2. The monitor for an injection molding machine according to claim 1, wherein the sampling means is provided in the injection molding machine.

3. The monitor for an injection molding machine according to claim 1, wherein the sampling means is outside the injection molding machine and connected to the injection molding machine.

4. The monitor for an injection molding machine according to claim 1, wherein said graphically displaying means is provided in the injection molding machine.

5. The monitor for an injection molding machine according to claim 1, wherein said graphically displaying means is outside the injection molding machine and connected to the injection molding machine.

6. The monitor for an injection molding machine according to claim 1, wherein said variable is a difference between a sampled variable and a reference variable which is a variable in a specific molding cycle.

7. The monitor for an injection molding machine according to claim 1, wherein the variable varying in one molding cycle in the injection molding process includes one of injection pressure, injection velocity, a screw position, screw rotation speed, backpressure, motor torque, a mold opening or closing position, a mold opening or closing speed, an ejector position or speed, and temperatures of a cylinder or a nozzle.

* * * * *

UNITED STATES PATENT AND TRADEMARK OFFICE
CERTIFICATE OF CORRECTION

PATENT NO.        : 7,261,009 B2                                  Page 1 of 1
APPLICATION NO. : 11/002309
DATED             : August 28, 2007
INVENTOR(S)       : Osamu Saito et al.

It is certified that error appears in the above-identified patent and that said Letters Patent is hereby corrected as shown below:

Column 3, Line 32, change "flowchart" to --flow chart--.

Column 3, Line 40, change "flowchart" to --flow chart--.

Column 4, Line 6, after "machine" insert --.--.

Column 5, Line 59, change "number," to --number m,--.

Column 6, Line 45, change "above-described-processing," to --above-described processing,--.

Column 8, Line 6, change "flowchart" to --flow chart--.

Signed and Sealed this

Eighth Day of July, 2008

JON W. DUDAS
*Director of the United States Patent and Trademark Office*